(12) United States Patent
Singhal et al.

(10) Patent No.: US 7,847,681 B2
(45) Date of Patent: Dec. 7, 2010

(54) BUILDING AUTOMATION SYSTEMS AND METHODS

(75) Inventors: Ashish Singhal, Williamsville, NY (US); Timothy I. Salsbury, Whitefish Bay, WI (US)

(73) Assignee: Johnson Controls Technology Company, Holland, MI (US)

( * ) Notice: Subject to any disclaimer, the term of this patent is extended or adjusted under 35 U.S.C. 154(b) by 464 days.

(21) Appl. No.: 12/054,228

(22) Filed: Mar. 24, 2008

(65) Prior Publication Data

US 2008/0231437 A1 Sep. 25, 2008

Related U.S. Application Data

(60) Provisional application No. 60/919,980, filed on Mar. 26, 2007.

(51) Int. Cl.
*G08B 29/00* (2006.01)
(52) U.S. Cl. .................. 340/514; 340/3.1; 340/825.22; 700/276
(58) Field of Classification Search .................. 340/514, 340/3.1, 3.5–3.55, 825.22, 825.52, 870; 700/276–278
See application file for complete search history.

(56) References Cited

U.S. PATENT DOCUMENTS

| 7,623,413 B2 * | 11/2009 | McFarland | 367/127 |
| 2006/0009863 A1 * | 1/2006 | Lingemann | 700/276 |
| 2009/0033513 A1 * | 2/2009 | Salsbury et al. | 340/825.2 |

OTHER PUBLICATIONS

Aström, K. J. and T. Hägglund. Revisiting the Ziegler-Nichols Step Response Method for PID Control. *J. Process Control*, 14, 635-650 (2004).
Aström, K. J. and T. Hägglund. *Advanced PID Control*. Instrument Society of America, Research Triangle Park, NC (2005).
Billings, S. A. and S. Y. Fakhouri. Identification of a Class of Nonlinear Systems Using Correlation Analysis. *Proc. IEE*, 125, 691-697 (1978).
Bristol, E. H. On a New Measure of Interactions for Multivariable Process Control. *IEEE Trans. Automatic Control*, AC-11, 133-134 (1966).
Doyle, J. C. Analysis of Feedback Systems With Structured Uncertainties. *IEE Proc. Part D: Control Theory & Appl.*, 129, 242-250 (1982).
Johnson, C. R. and H. M. Shapiro. Mathematical Aspects of the Relative Gain Array $(AoA^{-T})$. *Siam J. on Algebraic and Discrete Methods*, 7, 627-644 (1986).

(Continued)

*Primary Examiner*—Eric M Blount
(74) *Attorney, Agent, or Firm*—Foley & Lardner LLP

(57) ABSTRACT

A monitoring system, including an interface configured to communicate with a building device, a sensor, and a memory. The monitoring system includes a processor configured to communicate with the memory and the interface. The processor is configured to transmit a test signal to at least one of the building device and the sensor. The processor is further configured to receive a return signal from at least one of a building device signal and a sensor signal. Further, the processor is configured to associate the building device to the sensor based on the return signal.

20 Claims, 12 Drawing Sheets

OTHER PUBLICATIONS

Kookos, I. K. and A. I. Lygeros. An Algorithmic Method for Control Structure Selection Based on the RGA and RIA Interaction Measures. *Trans. IChemE*, 76, 458-464 (1998).

McAvoy, T. J., Y. Arkun, R. Chen, D. Robinson and P.D. Schnelle. A New Approach to Defining a Dynamic Relative Gain. *Control Eng. Practice*, 11, 907-914 (2003).

Miao, B., R. Zane and D. Maksimović. System Identification of Power Converters With Digital Control Through Cross-Correlation Methods. *IEEE Trans. Power Elec.*, 20, 1093-1099 (2005).

Orfanidis, S. *Optimum Signal Processing: An Interduction*. Prentice Hall, Englewood Cliffs, NJ (1996).

Salsbury, T. I. Continuous-time Model Identification for Closed Loop Control Performance Assessment. *Control Eng. Practice* (accepted) (2006).

Skogestad, S. and I. Postlethwaite. *Multivariable Feedback Control*. John Wiley & Sons, Ltd., West Sussex, England, $2^{nd}$ edn. (2005).

Stanley, G., M. Marino-Galarraga and T. J. McAvoy. Shortcut Operability Analysis: 1. The Relative Disturbance Gain. *Ind. Eng. Chem. Process. Des. Dev.*, 24, 1181-1188 (1985).

Witcher, M. and T. J. McAvoy. Interacting Control Systems: Steady State and Dynamic Measurement of Interaction. *ISA Transactions*, 16, 35-41 (1977).

Wolff, E. A. *Studies on Control of Integrated Plants*. Ph.D. dissertation, Norwegian Institute of Technology, Trondheim, Norway (1994). URL http://www.nt.ntnu.no/users/skoge/publications/thesis/1994_wolff/wolff.pdf.

Xiong, Q., W.-J. Cai, M.-J. He and M. He. Decentralized Control System Design for Multivariable Processes—A Novel Method Based on Effective Relative Gain Array. *Ind. Eng. Chem. Res.*, 45, 2769-2776 (2006).

Xiong, Q., C. Wen-Jian and M.-J. He. A Practical Loop Pairing Criterion for Multivariable Processesss. *J. Process Control*, 15, 741-747 (2005).

\* cited by examiner

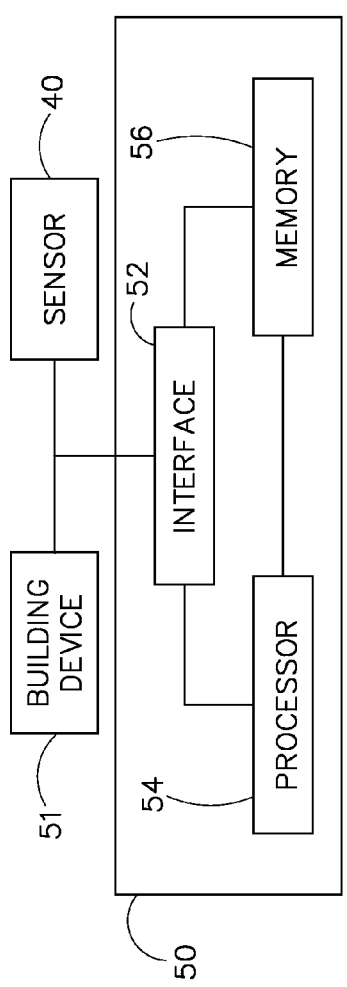
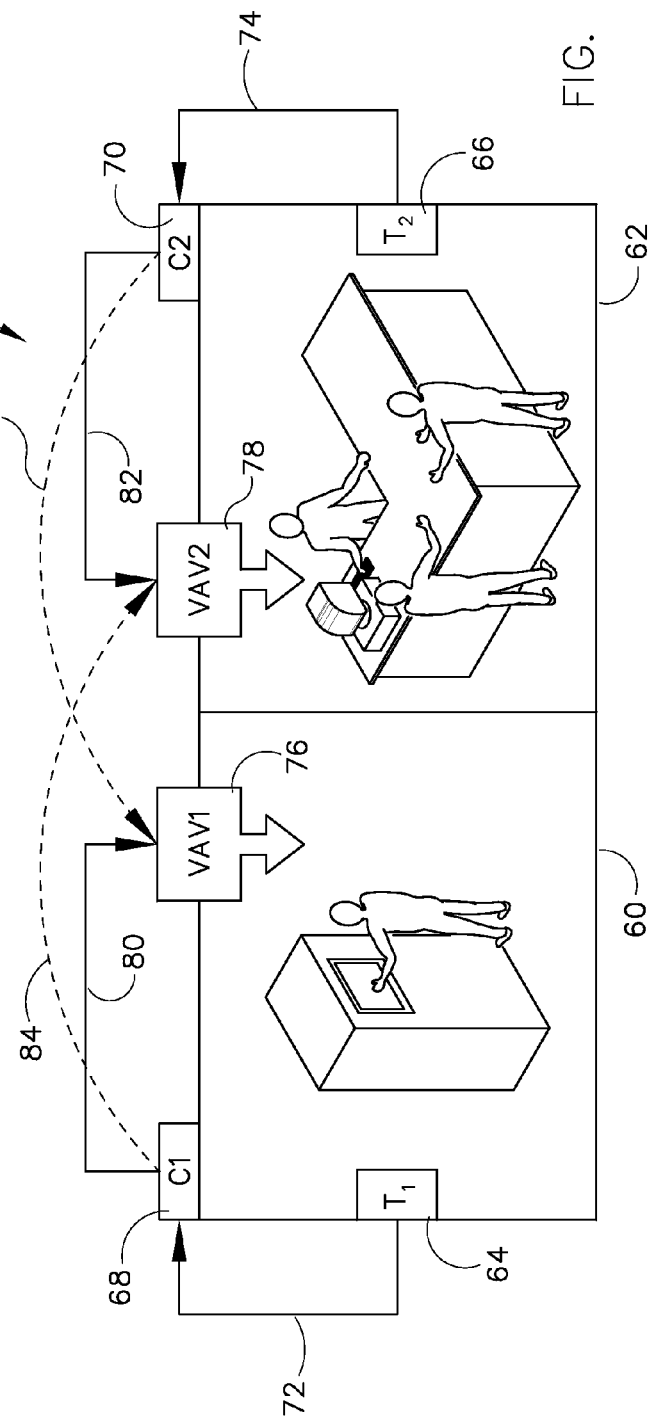

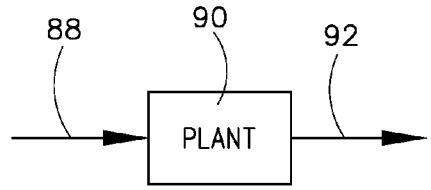
FIG. 5A
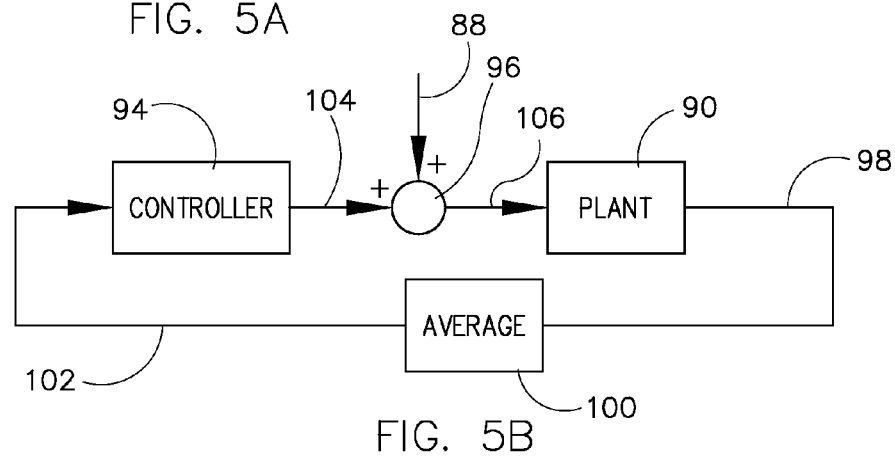
FIG. 5B
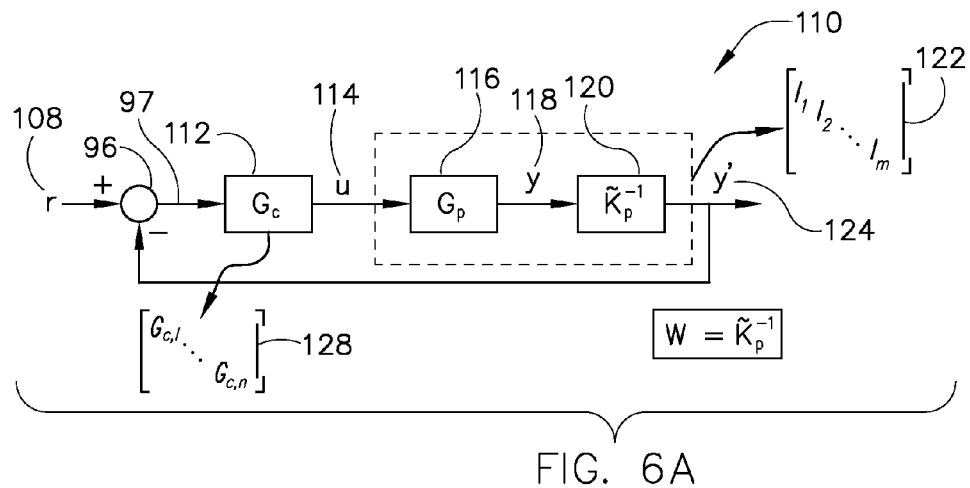
FIG. 6A
FIG. 6B
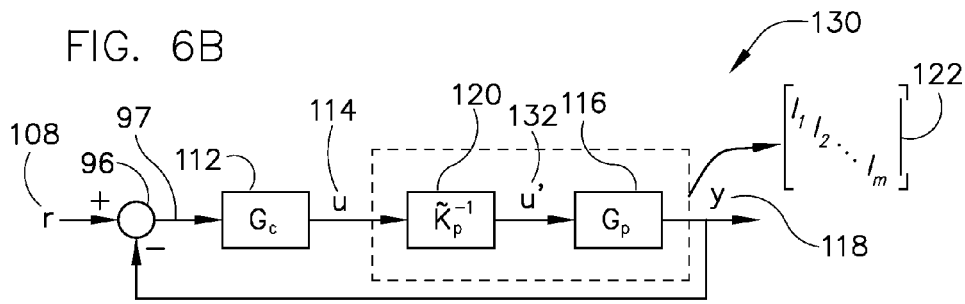

BUILDING AUTOMATION SYSTEMS AND METHODS

CROSS REFERENCE TO RELATED PATENT APPLICATIONS

The present application claims the benefit of priority to U.S. Provisional Application No. 60/919,980 titled "Building Automation Systems and Methods" filed on Mar. 26, 2007, which is hereby incorporated by reference.

BACKGROUND

The present disclosure relates generally to the field of building automation systems and methods, and more particularly to configuring a multivariable HVAC system that includes multiple sensors and actuators.

HVAC systems are commonly controlled by a proportional-integral-derivative (PID) controller that is configured to maintain a sensor output at a desired value using a specified actuator/manipulated device. For large systems (e.g., large office spaces/auditoriums), many sensors and many VAV boxes may be present. During the commissioning phase, the user manually configures the control system to control the output of a particular sensor using a particular manipulated device. Thus, out of many available choices, the plant input and output are manually determined by the user. This procedure is referred to as "pairing" of sensors and actuators.

Pairing of the sensors and actuators can be a repetitive, time consuming process that may lead to an installation that incorrectly pairs a sensor to an actuator.

SUMMARY

The invention relates to a monitoring system including an interface configured to communicate with a building device, a sensor, and a memory. The monitoring system includes a processor configured to communicate with the memory and the interface. The processor is configured to transmit a testing signal to at least one of the building device and the sensor. The processor is further configured to receive at least one of a building device signal and a sensor signal. Further, the processor is configured to determine a building-device-sensor pairing based on the at least one of the building device signal and the sensor signal.

The invention also relates to a method of monitoring a system including transmitting a testing signal to at least one of a building device and a sensor. The method includes receiving at least one of a building device signal and a sensor signal. The method further includes determining a building-device-sensor pairing based on the at least one of the building device signal and the sensor signal.

The invention also relates to a program product for monitoring a system, the program product comprising machine-readable program code for causing, when executed, one or more machines to perform the steps of transmitting a test signal to at least one of a building device and a sensor, receiving a return signal from at least one of the building device and the sensor, and determining an association between the building device and the sensor based on the return signal.

BRIEF DESCRIPTION OF THE DRAWINGS

The application will become more fully understood from the following detailed description, taken in conjunction with the accompanying figures.

FIG. 3 is a circuit diagram of a system, according to an exemplary embodiment;

FIG. 4 is an illustration of an incorrect sensor-actuator pairing, according to an exemplary embodiment;

FIGS. 5A-5B are illustrations of an open and closed loop tests for identifying plant parameters, according to exemplary embodiments;

FIGS. 6A-6C are illustrations of static decoupling methods, according to exemplary embodiments;

DETAILED DESCRIPTION

Before turning to the figures which illustrate the exemplary embodiments in detail, it should be understood that the application is not limited to the details or methodology set forth in the description or illustrated in the figures. It should also be understood that the terminology employed herein is for the purpose of description only and should not be regarded as limiting.

Figure 1:
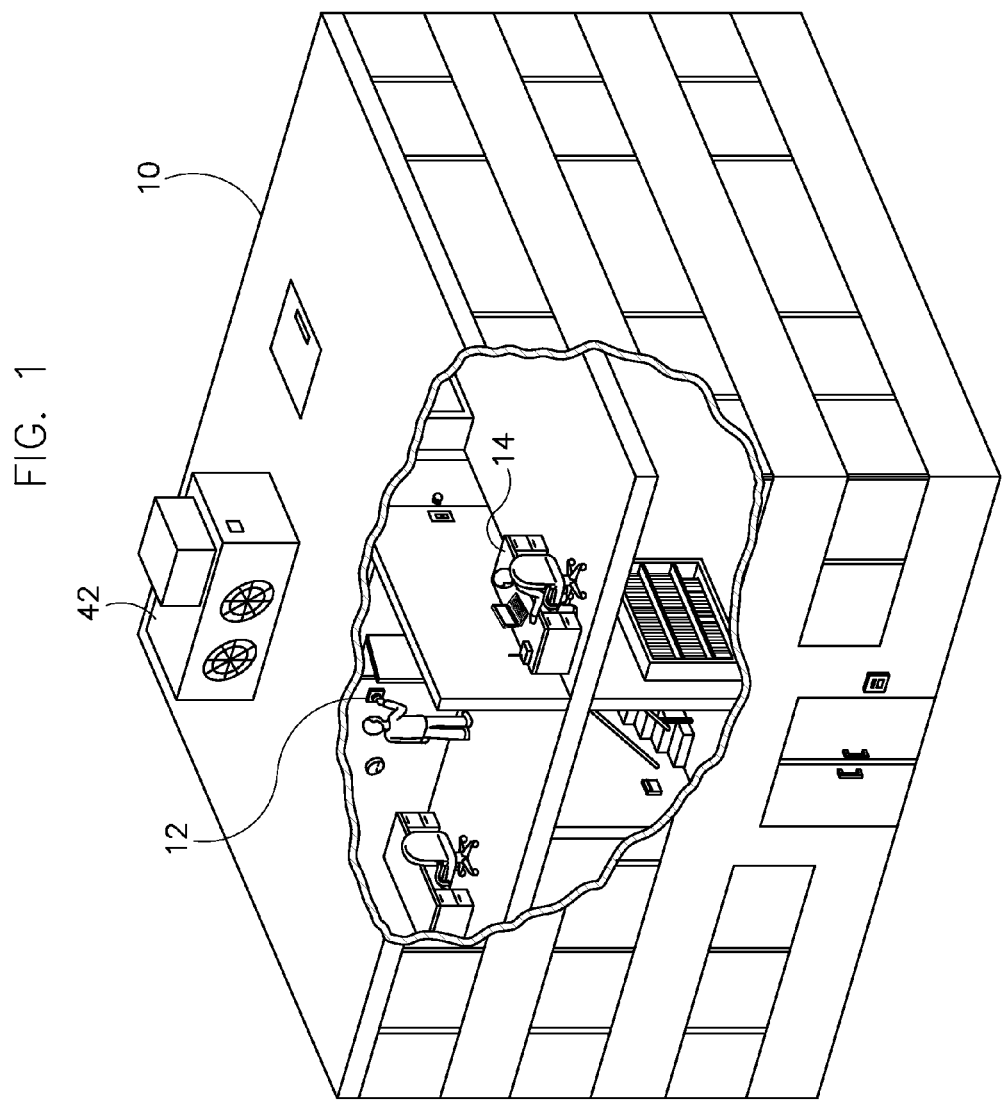
FIG. 1 is an isometric view of a building according to an exemplary embodiment with an HVAC system.

FIG. 1 shows a building 10 with an air-handling unit 42 according to an exemplary embodiment. Air handling unit 42 is part of a heating, ventilation and air conditioning (HVAC) system that controls the environment of a portion of a building. An operator can adjust a thermostat 12, which may change the setpoint for the room and/or building environment. Based on the change in setpoint, the HVAC system may modify its operating parameters. An operator can also adjust the setpoint for the room and/or building environment from a workstation 14.

Figure 2:
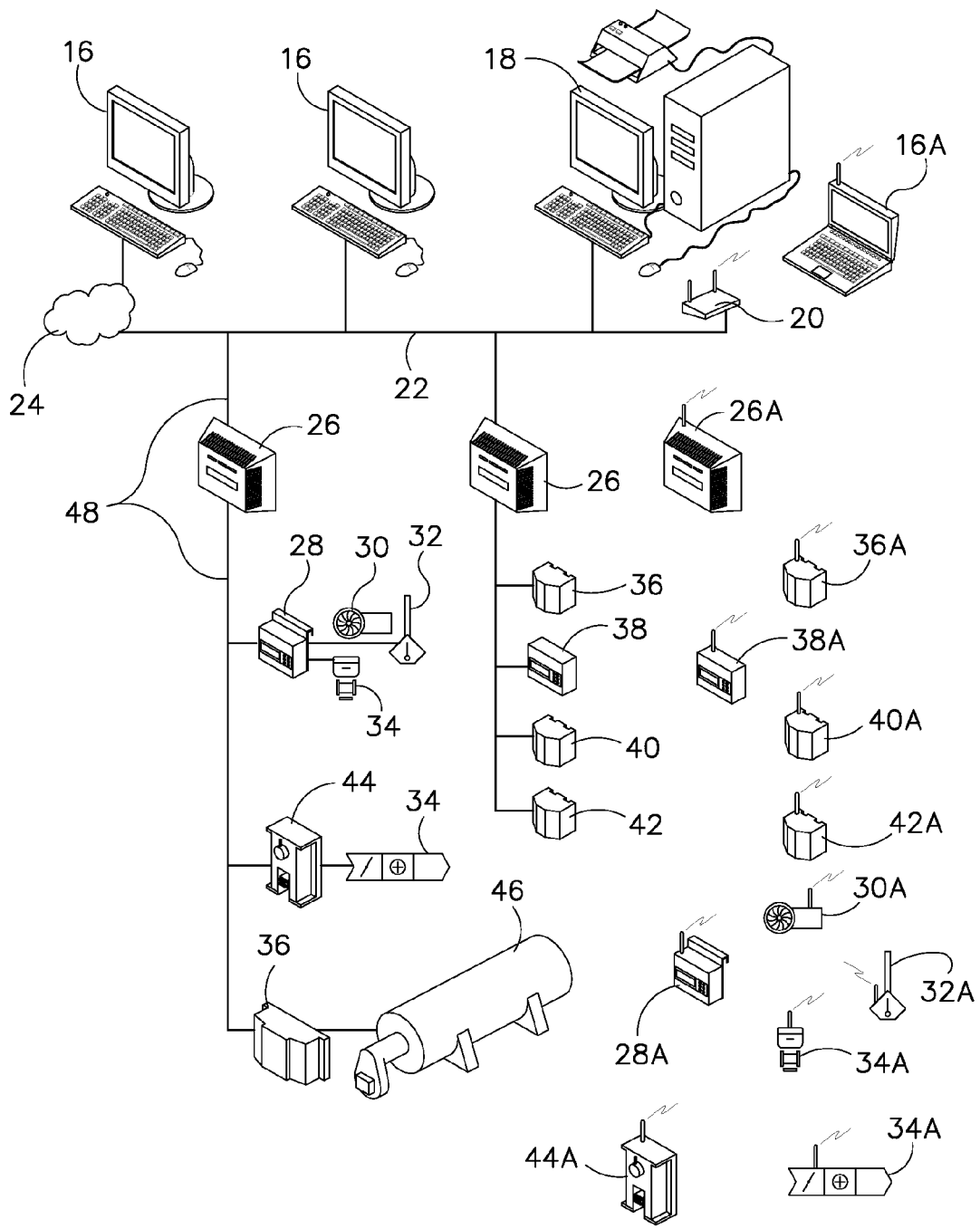
FIG. 2 is a schematic diagram of a building system, according to an exemplary embodiment.

Referring to FIG. 2, a schematic diagram of a building automation system ("BAS") is shown that may be used with the systems and methods of the present disclosure, according to exemplary embodiments. The BAS may include one or more network automation engines ("NAEs") 26 connected to a proprietary or standard communications network such as an Internet Protocol ("IP") network (e.g., Ethernet, WiFi, etc). NAEs 26 may support various field-level communications protocols and/or technology, including various Internet Protocols, BACnet over IP, BACnet Master-Slave/Token-Passing ("MS/TP"), N2 Bus, N2 over Ethernet, Wireless N2, LonWorks, ZigBee, and any number of other standard or proprietary field-level building management protocols and/or technologies. NAEs 26 may include varying levels of supervisory features and building management features. The user interface of NAEs 26 may be accessed via terminals 16, 16A (e.g., web-browser terminals) capable of communicably connecting to and accessing NAEs 26. For example, FIG. 2 shows multiple terminals 16, 16A that may be variously connected to NAEs 26 or other devices of the BAS. For example, terminals 16, 16A may access the BAS and connected NAEs 26 via a WAN, local IP network, or a connected wireless access point.

NAEs 26 may be connected to any number of BAS devices. The device may include, but is not limited to, devices such as a field-level control modules 28, 28A; a variable air volume modular assembly ("VMAs") 44, 44A; a variable air volume ("VAV") device 36, 36A; an extended digital controller 38, 38A; air handling unit ("AHU") controller 42, 42A; a boiler 46; a fan coil unit 30, 30A; a heat pump unit 32, 32A; a unit ventilator 34, 34A; expansion modules; blowers; a temperature sensor 40, 40A; a flow transducer; other sensors; motion detectors; actuators; dampers; heaters; air conditioning units; etc. The device may be controlled and/or monitored by NAEs 26. Data generated by or available on the various devices that are directly or indirectly connected to NAE 26 may be passed, sent, requested, or read by NAE 26 and/or sent to various other systems or terminals 16, 16A of the BAS. The system may utilize a wide area network 24, a wireless access point 20 and/or any other communication system. The system may also utilize a reporting center 18 which may be configured to generate a variety of reports relating to equipment matching, equipment performance, equipment maintenance, or any combination thereof.

Devices are shown as either wired devices (e.g., NAE 26, fan coil 30, unit ventilator 34, etc.) or wireless devices (e.g., NAE 26A, fan coil 30A, unit ventilator 34A, etc.). Some devices are shown as having a wired connection with NAE 26, 26A, while other devices may be wirelessly connected to NAE 26, 26A. Devices with wireless connections may have an antenna system used to communicate wirelessly with NAE 26, 26A. The antenna systems may transmit data to NAE 26, 26A, another wireless device, or a wired device. Likewise, a device with a wired connection may transmit data to NAE 26, 26A, another wired device, or a wireless device.

In FIG. 3, a schematic circuit 50 of the pairing system is shown, according to an exemplary embodiment. In an exemplary embodiment, schematic circuit 50 includes an interface 52, a processor 54 and a memory device 56. Interface 52 communicates with HVAC equipment (e.g., NAEs, actuators, sensors, AHU, etc.). In an exemplary embodiment, interface 52 communicates with a building device 51 and sensor 40. In an exemplary embodiment, interface 52 can transmit a testing signal, receive feedback from the testing signal and/or monitor the performance of the HVAC equipment. In an exemplary embodiment, processor 54 can process the data received from interface 52 to determine various characteristics of the HVAC equipment. In an exemplary embodiment, memory device 56 may be utilized to store data. This data storage may be temporary, short term, or permanent.

Referring to FIG. 4, an illustration of an incorrect sensor-actuator pairing 58 is shown. A first room 60 has a first temperature sensor 64, a first controller 68, a first sensor to controller communication link 72, and a first VAV 76. A second room 62 has a second temperature sensor 66, a second controller 70, a second sensor to controller communication link 74, and a second VAV 78. First room 60 and second room 62 are adjacent to each other. In an exemplary embodiment, all the sensors and actuators are wired utilizing wires that share common color codes. An installer may pull the wires from both rooms up into the plenum and connect one set to the first VAV box and the other set to the second VAV box. In the example shown in FIG. 4, the installer has connected first controller 68 to second VAV 78 by a first controller to second VAV communication link 84 and has connected second controller 70 to first VAV 76 by a second controller to first VAV communication link 86. The installer should have connected first controller 68 to first VAV 76 by a first controller to a first VAV communication link 80 and connected second controller 70 to second VAV 78 by a second controller to a second VAV communication link 82. In another exemplary embodiment, a similar situation may arise with wireless controllers. The commissioning device that wirelessly connects the sensors and actuators may receive and process the signal from the adjacent room instead of the same room.

In an exemplary embodiment, a large office space that has many VAVs 36, 36A and multiple sensors 40, 40A may be manually installed without consideration for which VAV 36, 36A and sensors 40, 40A should be matched together. In this exemplary embodiment, the pairing system may automatically determine which VAV 36, 36A should be paired with a particular sensor 40, 40A. In another exemplary embodiment, the pairing system can be utilized to provide information about the interactions between different components. The system may determine and suggest different VAV box-sensor pairings to optimize the system or provide a more robust tuning factor for decentralized control.

In an exemplary embodiment, selecting the control structure for the MIMO system involves first identifying plant parameters, and then using the parameters to determine the decentralized control structure. In an exemplary embodiment, a relative gain array ("RGA") approach may be utilized. In another exemplary embodiment, more complicated methods may be used that focus on accounting for model uncertainty and robust closed-loop stability (i.e. $H_\infty$ and $\mu$-synthesis methods).

Referring to FIGS. 5A-5B, illustrations of an open and closed loop tests for identifying plant parameters are shown, according to exemplary embodiments. The plant parameters are identified by introducing a test signal 88 in the actuators and observing the responses (e.g., return signals) of the different sensors 40, 40A to test signal 88. The configuration is then performed based on the values of the plant parameters by using the RGA method (pairing sensors and actuators).

In FIG. 5A, an open loop system is shown, according to an exemplary embodiment. Test signal 88 is transmitted to a plant 90 which creates an output signal 92. Output signal 92 interacts with sensors 40, 40A (see FIG. 2) to determine the sensor-actuator pairings.

In FIG. 5B, a closed loop system is shown, according to an exemplary embodiment. Test signal 88 is transmitted to a mixer 96. Mixer 96 combines test signal 88 with a controller signal 104 to create a plant input signal 106. Plant input signal 106 is received by plant 90 and processed by plant 90. The processed plant input signal 106 becomes a plant output signal 98, which is delivered to an averaging module 100. Averaging module 100 processes plant output signal 98 to generate a controller input signal 102, which is delivered to controller 94 and processed to create controller signal 104.

Figure 6C:
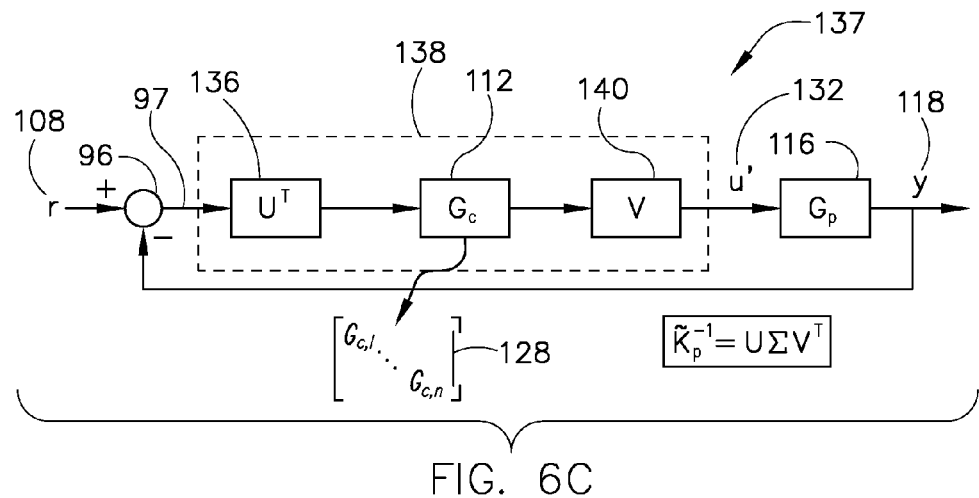

In FIGS. 6A-6C static decoupling methods are shown, according to exemplary embodiments. The static post-decoupler design may utilize a weighted average of sensor values for control. The test signals may be introduced sequentially (i.e., one actuator at a time), or simultaneously in all actuators. The static-decoupler may utilize a weighted actuator movement. The static-decoupler may utilize both the weighted actuator movement and the weighted average of the sensor values. It should be noted that these test signals may be introduced either in an open system or a closed loop system.

In FIG. 6A, a post-compensator system 110 is shown, according to an exemplary embodiment. It should be noted that a vector consists of elements (e.g., $R_1$ to $R_n$) and that the system may utilize vector procedures or other calculation methodologies not employing vectors. A set point vector 108 is received by mixer 96 and combined with a weighted plant output vector 124 to generate a control vector input 97. Control vector input 97 is received by a gain matrix controller 112. Gain matrix controller 112 processes control vector input 97 to generate a controller output 114. Gain matrix controller 112 may utilize a gain matrix 128 to calculate controller output 114. Controller output 114 can be transmitted to a gain plant 116. Gain plant 116 processes controller output 114 to generate a gain plant output 118 which is received by a weighting module 120. Weighting module 120 may be configured to weight sensor values or any other HVAC equipment characteristic values. Weighting module 120 may utilize a weighting sensor value matrix 122. It should be noted that weighting sensor value matrix 122 may be any other HVAC equipment characteristic value.

In FIG. 6B, a pre-compensator system 130 is shown, according to an exemplary embodiment. Set point vector 108 is mixed with gain plant output 118 to generate control vector input 97. Control vector input 97 is received by gain matrix controller 112 and processed by gain matrix controller 112 to generate controller output 114. Controller output 114 is received and processed by weighting module 120. Weighting module 120 weighs the actuator movements to generate a weighted actuator plant input signal 132 which is received by gain plant 116. Gain plant 116 processes weighted actuator plant input signal 132 to generate gain plant output 118.

In FIG. 6C, a pre and post compensator system 137 is shown, according to an exemplary embodiment. Set point vector 108 is mixed with gain plant output 118 to generate control vector input 97. Control vector input 97 is received by a weight sensor module 136. The output from weight sensor module 136 is received by gain matrix controller 112. The output from gain matrix controller 112 is received by a weight actuator module 140 which generates weighted actuator plant input signal 132 which is received by gain plant 116. Gain plant 116 processes weighted actuator plant input signal 132 to generate gain plant output 118.

In an exemplary embodiment, simultaneous excitation is supplied by a band-limited white noise signal, which is introduced at each actuator such that the test signal added to actuator i is uncorrelated to the test signal added to actuator j when i≠j. The cross-covariance at different lag times between the sensor values and each test signal 88 is calculated. In an exemplary embodiment, the peak of the cross-covariance function provides information related to the gain between a given sensor 40, 40A and actuator. For example, data regarding the movement of the actuator can be compared to sensor 40, 40A values. If sensor 40, 40A transmits a signal to the controller that is utilized to request increased heating or cooling and an actuator does not move, then the sensor-actuator relationship may be weak. It should be noted that the actuator could be disabled for other reasons (e.g., maintenance or broken), which may be taken into consideration.

In another example, if sensor 40, 40A transmits a signal to the controller that is utilized to request increased heating or cooling and an actuator does move, then the sensor-actuator relationship may be established. This estimated gain matrix is then used either to calculate a RGA for pairing sensors and actuators, or to calculate a weight vector for weighting sensor values in relation to actuator resulting in static decoupling of interacting control loops.

In an exemplary embodiment, the system includes sensors numbered from $N_1$ to $N_n$ and actuators numbered from $A_1$ to $A_n$. Test signal 88 is transmitted to actuator $A_1$, which results in sensor $N_1$ moving ten units and sensors $N_2$ thorough $N_n$ moving zero units. The movement of the sensor and/or the building device may be determined based on return signals received from the sensor and/or the building device. In this exemplary embodiment, actuator $A_1$ and sensor $N_1$ have a one to one relationship. In another exemplary embodiment, test signal 88 is transmitted to actuator $A_1$, which results in sensor $N_1$ moving five units, sensor $N_2$ moving zero units, sensor $N_3$ moving three units, sensor $N_4$ moving one unit, sensor $N_5$ moving one unit, and sensors $N_6$ thorough $N_n$ moving zero units. In this exemplary embodiment actuator $A_1$ and sensors $N_1$, $N_3$, $N_4$, and $N_5$ have a relationship. An actuator to sensor relationship may be quantified by utilizing the amount of units moved. It should be noted that these exemplary embodiments may be utilized with any of the testing processes disclosed and may be utilized in a concurrent and/or sequential implementation of test signals 88.

In an exemplary embodiment, sequential excitation is utilized, which may require a sine wave with frequency equal to $2\pi/T$ rad/s to be added to one input at a time, where T is an assumed time-constant for the plant. In this exemplary embodiment, T≈900 s for zone temperature control loops. The amplitude of the each oscillating sensor signal is calculated after waiting for three oscillation periods. The amplitude of the sensor signal gives an estimate of the gain between each sensor 40, 40A and the actuator. This procedure is repeated for every actuator. The gain information can also be estimated by introducing step changes in each actuator in an open-loop system by measuring the change in sensor values. After estimating the gain values for every actuator, the gain matrix may be used to determine the pairing between the sensors and actuators or sensor weights may be calculated for the static post-decoupler design. It should be noted that because the sine waves can be selected with different frequencies and thereby allowing the sine waves to be distinguishable, the excitation step may be implemented simultaneously and not sequentially.

Figure 7:
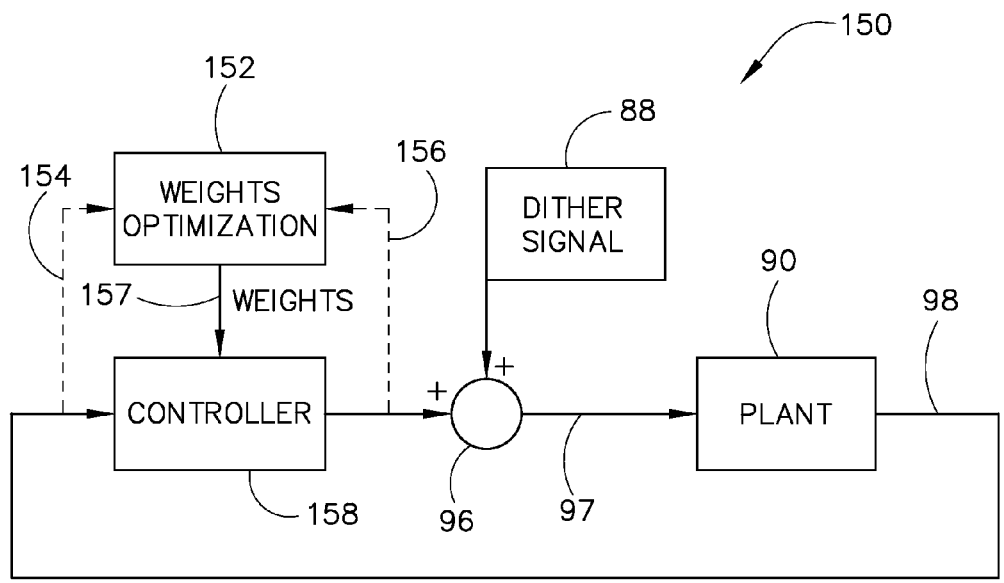
FIG. 7 is an illustration of a system that automatically configures the optimizing sensor weights, according to one exemplary embodiment.

In FIG. 7, a pairing system 150 that automatically determines the optimal sensor pairing is shown, according to one exemplary embodiment. The approach may be implemented in a closed loop system where each controller assigns different weights to sensor values to optimize the control functionality. The pairing system 150 includes a controller 158, a weights optimization module 152, mixer 96, test signal 88, plant 90, a plant output signal 98, a first weight optimization module input 154, and a second weight optimization module input 156.

In an exemplary embodiment, controller 158 initially gives equal weighting to every sensor 40, 40A. Test signal 88 (e.g., a small white noise dither signal) is injected into each actuator simultaneously and the performance of each controller is measured in response to the excitation. For controller 158, weight optimization module 152 includes an optimization algorithm that may be configured to adjust the weights assigned to each sensor 40, 40A to improve control performance. In this exemplary embodiment, the system learns about the interaction between different zones to determine the best control structure automatically. The approach results in a static-decoupling control structure. Weight optimization module 152 obtains first weight optimization module input 154 and second weight optimization module input 156. First weight optimization module input 154 represents a controller input signal and second weight optimization module input 156 represents a controller output signal. First weight optimization module input 154 and second weight optimization module input 156 are utilized to generate a weighting control signal 157 which is received by controller 158.

In an exemplary embodiment, a MIMO plant with n inputs and n outputs is represented by the continuous-time transfer function G (s):

$$G(s) = \begin{bmatrix} G_{1,1}(s) & G_{1,2}(s) & \cdots & G_{1,n}(s) \\ G_{2,1}(s) & G_{2,2}(s) & \cdots & G_{1,n}(s) \\ \vdots & \vdots & \ddots & \vdots \\ G_{n,1}(s) & G_{n,2}(s) & \cdots & G_{n,n}(s) \end{bmatrix} \quad (1)$$

Let $u_j$ be the $j^{th}$ input and $y_i$ be the $i^{th}$ output of the plant. Denote the plant input and output vectors u and y as:

$$u \triangleq [\, u_1 \quad u_2 \quad \cdots \quad u_n \,]^T \quad (2)$$
$$y \triangleq [\, y_1 \quad y_2 \quad \cdots \quad y_n \,]^T$$

The dynamic behavior of many HVAC systems, such as rooms and large spaces, can be approximated by second or third-order dynamics having a monotone step response. Thus, each element of G(s) is assumed to be of the form:

$$G_{i,j}(s) = \frac{K_{i,j}}{(T_{i,j}^{(1)} s + 1)(T_{i,j}^{(2)} s + 1)(T_{i,j}^{(3)} s + 1)} \quad (3)$$

where $K_{i,j}$ is the plant gain and $T_{i,j}^{(1)}$, $T_{i,j}^{(2)}$, $T_{i,j}^{(3)}$ are the time-constants for the $y_i$-$u_j$ pair. In order to reduce the degrees of freedom, it is assumed that $T_{i,j}^{(1)}$, $T_{i,j}^{(2)}$, $T_{i,j}^{(3)}$ are in the ratio 1:2:3. Thus, the plant model for the $y_i$-$u_j$ pair becomes:

$$G_{i,j}(s) = \frac{K_{i,j}}{(T_{i,j} s + 1)(2 T_{i,j} s + 1)(3 T_{i,j} s + 1)} \quad (4)$$

Now, $G_{i,j}(s)$ is described by only two parameters: $K_{i,j}$ representing the static gain, and $T_{i,j}$ now representing the dynamic behavior. MIMO plant identification now involves estimating $K_{i,j}$ and $T_{i,j}$ for $1 \leq i,j \leq n$.

In another exemplary embodiment, a single input and single output ("SISO") discrete $E[(y_i - \bar{y}_i)(u_j - \bar{u}_j)] = 0$ for $i \neq j$, plant model is illustrated. If the input u is Gaussian noise with unit variance, then the cross-covariance function between the plant output y and u at lags $l \geq 0$ is proportional to the unit pulse response of the plant. For discrete MIMO plants, when all inputs are excited simultaneously, it can be shown that if the plant inputs are uncorrelated, that is then, $$\frac{E[(y_i(t+l) - \bar{y}_i)(u_j(t) - \bar{u}_j)]}{E[(u_j(t) - \bar{u}_j)^2]} = h_{i,j}(l) \quad (5)$$

where, $\bar{y}_i$ and $\bar{u}_j$ are the mean values of $y_i$ and $u_j$ respectively and $h_{i,j}(l)$ is the unit pulse response. The left side of Eq. (5) represents the cross-correlation between $y_i$ and $u_j$ normalized by the variance of $u_j$, while the right side represents the discrete time-domain unit pulse response of $G_{i,j}(z^{-1})$. The normalized cross-covariance, $\hat{h}_{i,j}(l)$, is given by $$\hat{h}_{i,j}(l) = \left( \frac{N-1}{N-l} \right) \left[ \frac{\sum_{t=0}^{N-l-1} [y_i(t+l) - \bar{y}_i][u_j(t) - \bar{u}_j]}{\sum_{t=0}^{N-1} [u_j(t) - \bar{u}_j]^2} \right] \quad (6)$$

and N is the number of observations in the sample.

In an exemplary embodiment, the parameters $K_{i,j}$ and $T_{i,j}$ of $G_{i,j}(s)$ can be estimated from the features of its unit pulse response. The peak of the unit pulse response is located at:

$$t_{peak} = \text{a multiple of the time constant}(T) \quad (7)$$

and the peak value is approximately:

$$h_{peak} \approx \psi \times \frac{K \times \Delta t}{T} \quad (8)$$

where $\Delta t$ is the sampling period, and $\psi$ is a constant. The peak value may be used for determining the control structure because it is proportional to the "effective gain" of the sub-plant $G_{i,j}(s)$.

Figure 8:
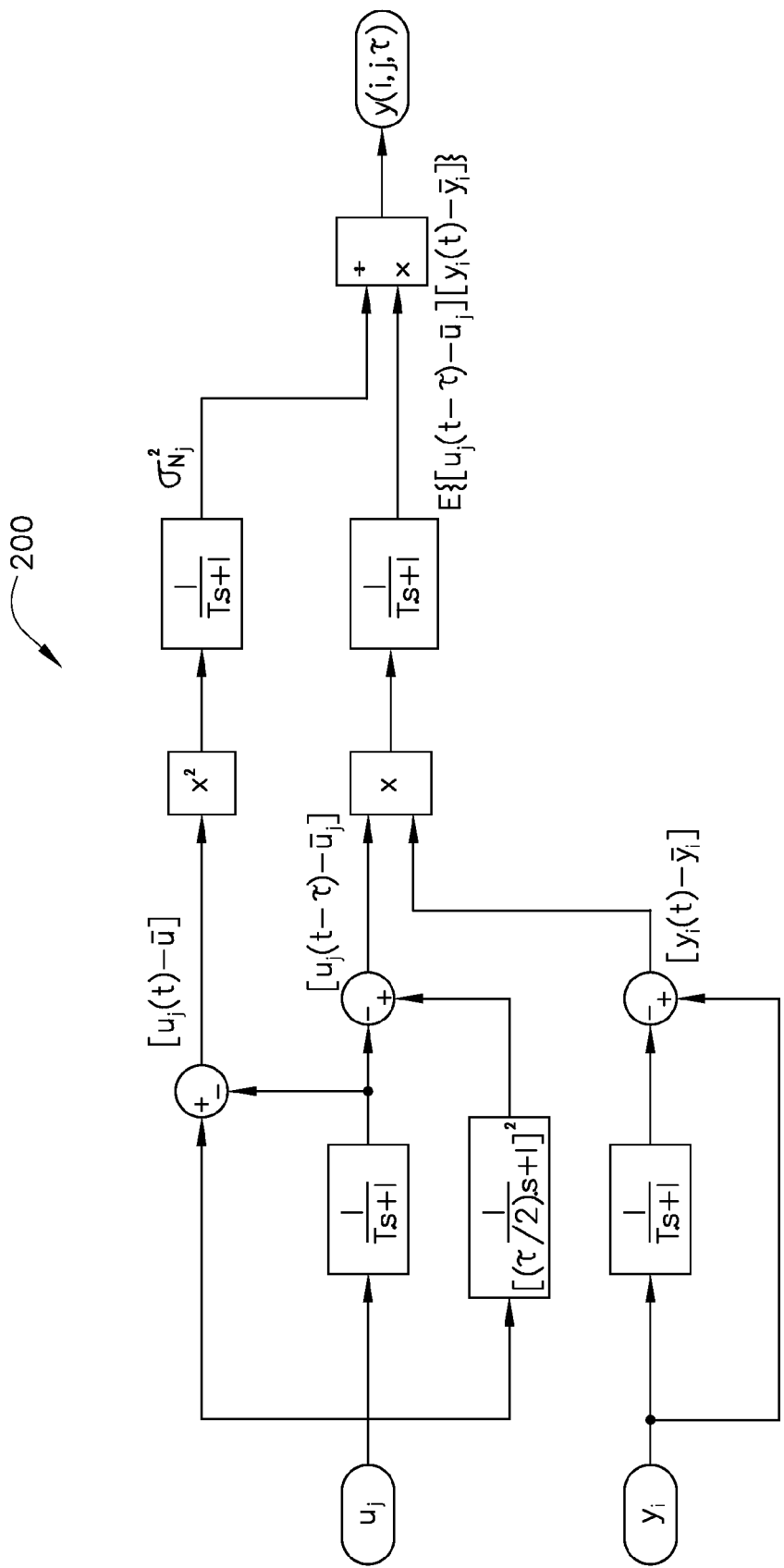
FIG. 8 is an illustration of an online implementation method, according to one exemplary embodiment.

In FIG. 8, an illustration of an online implementation method 200 is shown, according to one exemplary embodiment. The online implementation method calculates $\hat{h}_{i,j}(l)$ using Eq. (6), which requires storing a batch of data and then calculating the cross-correlation at different lags. In this exemplary embodiment, data storage capability may be required in the field device, which is assigned the task of performing the pairing.

In another exemplary embodiment, the storage and processing capacity may be reduced by using an exponentially weighted moving averages, or EWMAs. Because $E[y_i(t+l) \times u_j(t)] = E[y_i(t) \times u_j(t-l)]$, $u_j$ is lagged by l samples in the cross correlation calculation. The summation operations in calculating $E[y_i(t) \times u_j(t-l)]$ can be replaced by EWMAs with forgetting functionality to approximate the averaging process. FIG. 8 shows the block diagram for calculating the cross-correlation using EWMAs. The delay operation $u_j(t-l)$ can be approximated by an EWMA with a time constant $\tau = l$. This EWMA causes the lag l in Eq. (6) to be spread over lags in the vicinity of $\tau$. The value of $\tau$ for which $|\hat{h}_{i,j}(\tau)|$ is maximum gives an estimate of the time scale of the system. Since the time scale of the system may be unknown, the system may be configured to calculate $C(i, j, \tau)$ for a range of values of $\tau$. In exemplary embodiments, HVAC systems may have time scales ranging from a few seconds to a few hours. Thus, the pairing system may select exponentially spaced $\tau$ values to cover the entire range of expected time-scales. In exemplary embodiments, $\tau = 2^0, 2^1, \ldots, 2^{14}$ would be appropriate values.

In an exemplary embodiment, the calculation of the approximate value of lag l can be accomplished by using a higher-order filter in place of a simple EWMA with time-constant $\tau$. One can choose a filter $$H(s) = \frac{1}{\left( \frac{\tau}{d} s + 1 \right)^d},$$

where d is the filter order. As d increases, the approximation of the lag l improves. In the limit $d \to \infty$, the filter H(s)

becomes a pure lag. In an exemplary embodiment, the system sets the parameters to 1≦d≦4 for a higher-order approximation of a true lag. In this embodiment, larger values of d may result in less smoothing and less overlap of lags close to each other. In an exemplary embodiment, d=2 may be utilized in this system.

In an exemplary embodiment, a number of filters are required to approximate the cross-correlation calculation using EWMAs as shown in FIG. 8. In an exemplary embodiment, the calculation for the cross-correlation at different lags, $\tau=2^0, \ldots, 2^{14}$, may be accomplished by having only one value of $T=100 \times \tau_{max}$ for all values of $\tau$ to reduce the number of EWMAs. The total number of EWMAs in this case will be $2n_u+(2n_y+n_u n_y) \times n_{lags}$, where $n_u$, and $n_y$ are the number of plant inputs and outputs respectively, and $n_{lags}$ are the number of lags or $\tau$ values considered for the cross-correlation function calculation. The fixed value of T reduces the number of EWMAs while increasing the time required to calculate all cross-correlation values reliably. In this exemplary embodiment, the time requirement for the system may be about $3 \times T$ before reliable values are obtained.

In another exemplary embodiment, the calculation for the cross-correlation at different lags, $\tau=2^0, \ldots, 2^{14}$, may be accomplished by setting $T=100 \times \tau$ individually for each lag value. This procedure increases the number of EWMAs, but quicker results can be obtained for smaller lag values. The total number of filters in this case will be $(2n_u+2n_y+n_u n_y+n_u) \times n_{lags}$.

In another exemplary embodiment, sequential impulse or step tests may be utilized to identify the MIMO plant. This is accomplished by sequentially exciting each plant input and characterizing the plant outputs. In an exemplary embodiment, a step or impulse may be utilized for excitation for the input signal. In an exemplary embodiment, the first impulse response is considered. In another exemplary embodiment, an impulse response other than the first response is considered.

In an exemplary embodiment, unit pulse response characterization may be utilized to identify the MIMO plant. In this embodiment, each plant input is excited sequentially in order to identify the MIMO plant. When input j is excited, all other inputs are held at zero so that the effect of $u_j$ on the outputs may be observed. The peak value and its location in time can be used to obtain an estimate of $K_{i,j}/T_{i,j}$ from Eqs. (7) and (8) respectively. These two features can be used to estimate $K_{i,j}$ and $T_{i,j}$ from the response of $y_i$ to an unit pulse change in $u_j$.

After all the plant responses have settled to their original steady-state values, the next input is excited and the plant responses are used to identify another column of the G matrix.

In an exemplary embodiment, the pairing system determines when all the plant outputs have reached steady state and transmits the next testing input. In an exemplary embodiment, since the test is conducted in open loop, a reasonable time interval between the start and end of the responses is when 99% of the response is over. A third order plant described by Eq. (4) reaches 99% of its final value in 18.19T time units or about 3 residence times. Thus, the period between the start and end of each unit pulse response is approximately 18 $T_{i,j}$. Since all responses should be complete before the next input can be excited, a period of $\max_i\{18.19\ T_{i,j}\}$ time units should elapse before the next input can be excited. Note that although the values of $T_{i,j}$ can be determined during the test, the system may wait 3 times the expected residence time (e.g., 15 minute residence time for room loops) before exciting the subsequent input.

In an exemplary embodiment, the step response characterization may be utilized. The cross-correlation and unit pulse response methods are sample rate dependent. The faster the sampling period, the smaller the peak of the unit pulse response (see Eq. (8)). Thus, for fast sampling rates, the peak of the impulse response is likely to be corrupted by noise. Characterizing the step response, however, provides a way to identify the plant independent of the sampling rate. Each input is stepped sequentially from 0 to 100% and the plant responses are characterized. Standard system identification methods may be used to estimate the parameters $K_{i,j}$ and $T_{i,j}$.

In another exemplary embodiment, input-output pairing using RGA may be utilized. In one exemplary embodiment, dynamic interaction may be used as a way of pairing and/or calculating a RGA. In one exemplary embodiment, an effective RGA ("ERGA") method for pairing the inputs and outputs of a MIMO system may be used.

In this exemplary embodiment, it is considered that the n×n MIMO system a continuous time third-order transfer functions given by Eq. (4). For the third order plant given by Eq. (4):

$$|G_{i,j}(\iota\omega)| = \frac{K_{i,j}}{\sqrt{(\omega^2 T_{i,j}^2 + 1)(4\omega^2 T_{i,j}^2 + 1)(9\omega^2 T_{i,j}^2 + 1)}} \quad (9)$$

This calculates the "effective gain" of $G_{i,j}$ by integrating the area under the $|G_{i,j}(\iota\omega)|$ curve from zero to a critical frequency, $\omega_{cf,i,j}$, of the plant. The critical frequency could either be the bandwidth of $G_{i,j}(s)$ which is the frequency $\omega_{B,i,j}$ such that $|G_{i,j}(0)|/|G_{i,j}(\iota\omega_{B,i,j})|=\sqrt{2}$, or the ultimate frequency, $\omega_{u,i,j}$ which is the frequency at which the phase of $G_{i,j}(\iota\omega)$ first crosses $-\pi$ from above. For third-order plants, $\omega_{B,i,j}=0.0588/T_{i,j}$ and $\omega_{u,i,j}=1/T_{i,j}$. Thus, for some critical frequency of the plant, $\omega_{cf,i,j}=c/T_{i,j}$, where c is a constant. The effective gain, $e_{i,j}$ is calculated as:

$$\begin{aligned} e_{i,j} &= \int_0^{\omega_{cf,i,j}} |G_{i,j}(\iota\omega)| d\omega \quad (10)\\ &= \int_0^{\omega_{cf,i,j}} \frac{K_{i,j}}{\sqrt{(\omega^2 T_{i,j}^2 + 1)(4\omega^2 T_{i,j}^2 + 1)(9\omega^2 T_{i,j}^2 + 1)}} d\omega \\ &= \frac{K_{i,j}}{T_{i,j}} \int_0^c \frac{dx}{\sqrt{(x^2 + 1)(4x^2 + 1)(9x^2 + 1)}}, (x = \omega T_{i,j})\\ &= \frac{K_{i,j}}{T_{i,j}} \times \kappa \end{aligned}$$

Thus, the effective gain matrix, $E=k\times\{K_{i,j}/T_{i,j}\}$. The ERGA is calculated as:

$$\begin{aligned} \Lambda &\triangleq E \otimes (E^{-1})^T \quad (11)\\ &= (\kappa \times \{K_{i,j}/T_{i,j}\}) \otimes (\kappa^{-1} \times \{K_{i,j}/T_{i,j}\}^{-1})\\ &= \{K_{i,j}/T_{i,j}\} \otimes \{K_{i,j}/T_{i,j}\}^{-1} \end{aligned}$$

where ⊗ denotes the Hadamard or elementwise product. Thus, the constant k cancels out in the ERGA calculation.

In the calculation of Eq. (11), the pseudo-inverse is used to avoid ill-conditioning of the effective gain matrix. This situation can arise if one or more inputs has no effect on any output, or if one or more inputs cannot be controlled by the given set of inputs. If the row sum of the elements of $\Lambda$ is close to zero, then the output ($y_i$) corresponding to that row cannot be controlled with the given set of inputs. If the column sum of the elements of Λ is close to zero, then the input ($u_j$) corresponding to that column has very little or no effect on the outputs. In an exemplary embodiment, the ERGA can also be calculated using the pseudo-inverse for non-square systems.

In an exemplary embodiment, the numeric values of the ERGA elements suggest the pairing of plant inputs and outputs. In this exemplary embodiment, the decision of pairing input j with output i is usually performed by an expert or expert system based on the ERGA values. In another exemplary embodiment, the process may be automated to allow for processing of larger systems. In this exemplary embodiment, an algorithmic procedure may be used to automate the pairing decisions based on the ERGA. In an exemplary embodiment, this procedure can be accomplished by a simpler, iterative RGA approach. In another exemplary embodiment, this procedure can be accomplished by determining the best pairing from different combinations using the relative interaction array.

In the exemplary embodiment that follows, the iterative RGA approach is detailed. If Λ(K) represents the RGA calculated from the gain matrix K (or ERGA calculated from the effective gain matrix E), then $$\Lambda^\infty = \lim_{k \to \infty} \Lambda^k(K) = I^P,$$

where $I^P$ is a permuted identity matrix and $\Lambda^2(K)=\Lambda(\Lambda(K))$, $\Lambda^3(K)=\Lambda(\Lambda(\Lambda(K)))$, and so on. The permuted identity matrix may be used to determine pairings based on its non-zero entries. In this exemplary embodiment, $\Lambda^\infty$ converges to a permuted identity matrix if K is a positive definite Hermitian matrix.

In an exemplary embodiment, the iterative RGA methodology may only require 5-8 iterations to converge on to a permuted identity matrix. The system may sometimes try to recommend pairing on a negative RGA element, which may subsequently lead to closed-loop instability due to negative feedback and/or integral control action. In an exemplary embodiment, this can be avoided by zeroing the negative RGA elements before proceeding with the iterations. If the modified RGA loses rank, then a pairing on positive RGA is not possible. Otherwise, if a pairing exists on a positive RGA element, it will be found in $\Lambda^\infty$.

In an exemplary embodiment, identifying the plant parameters step is completed before using RGA for pairing sensors and actuators of an HVAC system. A practical consideration for implementing this strategy during the building commissioning phase is the test duration for system identification. Since the cross-correlation method excites all inputs simultaneously, all plant parameters can be identified in less time. However, it is a method based on statistical learning and thus, the results become more accurate with increasing test duration.

The sequential test methods require that all inputs be excited before the complete plant model is identified and pairing can be performed. The unit pulse response method requires reduced computational effort. However, it is also dependent on the sampling period like the cross-correlation method. The step response method is the most accurate and is independent of the sampling period, but has a higher computational load of the three methods considered.

The choice of plant test depends on not only the testing period, but also the computational effort required for obtaining the models. For the highest level of detail, the sequential step testing may be utilized. A quicker estimate may be obtained using the cross-covariance method. For small size systems (n<10), sequential testing may yield quicker results with the same accuracy as simultaneous input excitation.

Figure 9:
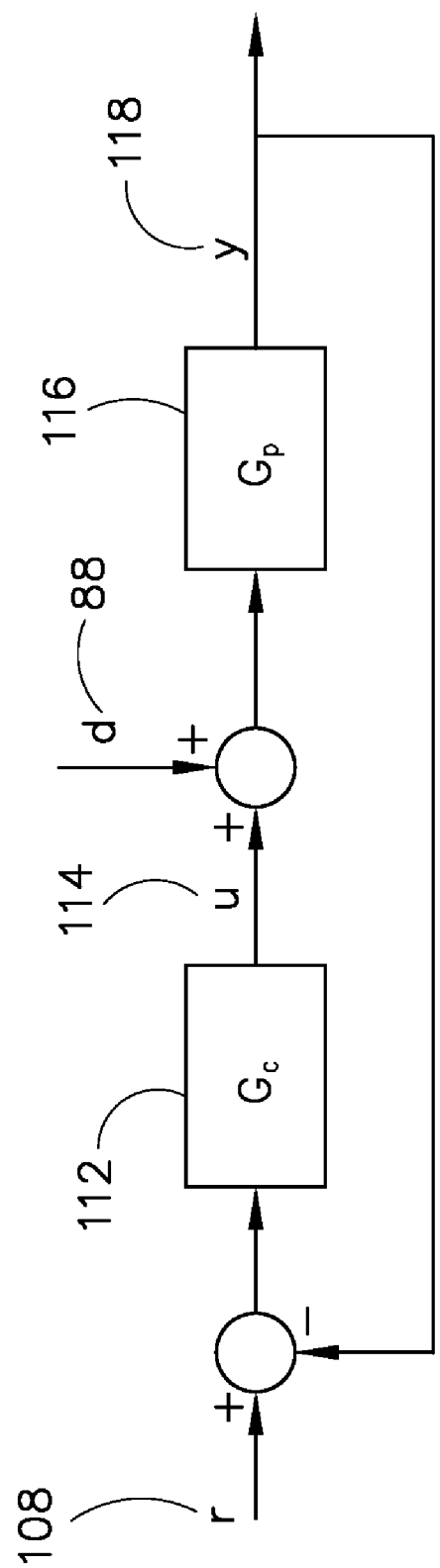
FIG. 9 is an illustration of a method for identifying the plant gain, according to one exemplary embodiment.

In FIG. 9, an illustration of a method for identifying the plant gain, according to one exemplary embodiment is shown. In exemplary embodiments, the excitation signal may be injected at any point in the loop.

Figure 10:
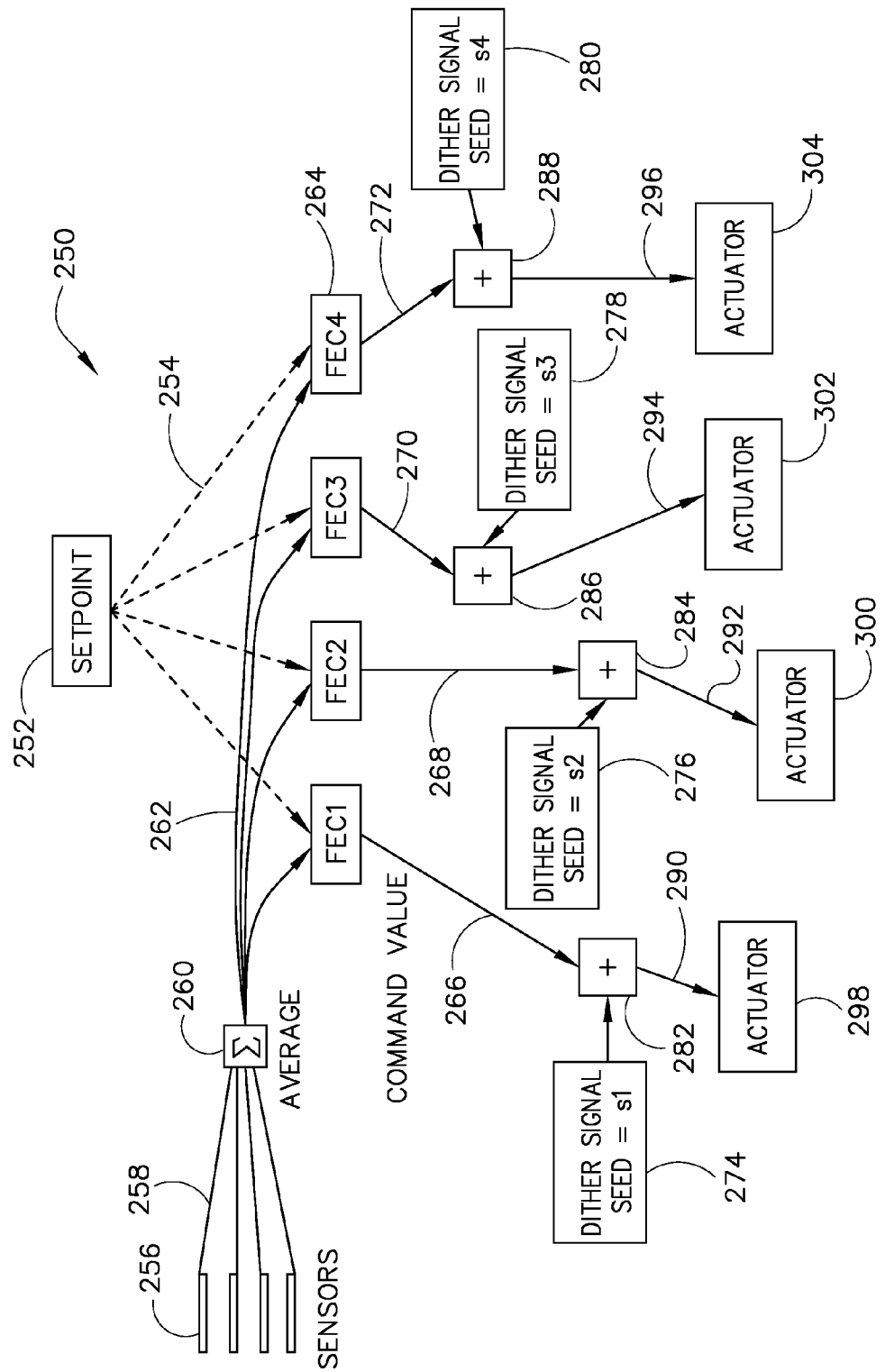
FIG. 10 is an illustration of a method of implementing a testing procedure, according to one exemplary embodiment.

In FIG. 10, an illustration of a method of implementing a testing procedure 250 is shown, according to one exemplary embodiment. The test procedure may be utilized for multiple sensors 256 and multiple actuators. The dither signal can be inserted simultaneously into multiple points or sequentially. A set point manager 252 transmits a set point signal 254 to a few forward error correction ("FEC") modules 264. It should be noted that set point manager 252 can transmit one set point signal 254, a few set point signals 254, or numerous set point signals 254. It should also be noted that the set point signals 254 can be different set point values for different HVAC equipment. Plurality of forward error correction modules 264 may be configured to communicate with each other, work in a cooperative fashion or work in isolation. Forward error correction modules 264 may have different procedures (e.g., process steps, algorithms, etc.) to make adjustments to the HVAC equipment. Forward error correction modules 264 receive set point signal 254, and an average sensor value signal 262. Average sensor value signal 262 is computed by averaging module 260. Averaging module 260 obtains inputs from sensors 256 to generate average sensor value signal 262. Forward error correction modules 264 transmit a command value 266, 268, 270, and 272 to a test signal mixers 282, 284, 286, and 288. In an exemplary embodiment, dither signals 274, 276, 278, and 280 are mixed with command value 266, 268, 270, and 272 in test signal mixers 282, 284, 286, and 288 to generate an actuator input signal 290, 292, 294, and 296. Actuator input signal 290, 292, 294, and 296 is inputted to an actuator 298, 300, 302, and 304. In this exemplary embodiment, the system may be configured to pair the sensors and actuators in a MIMO system using various pairing techniques. These pairing techniques may be implemented automatically.

Figure 11:
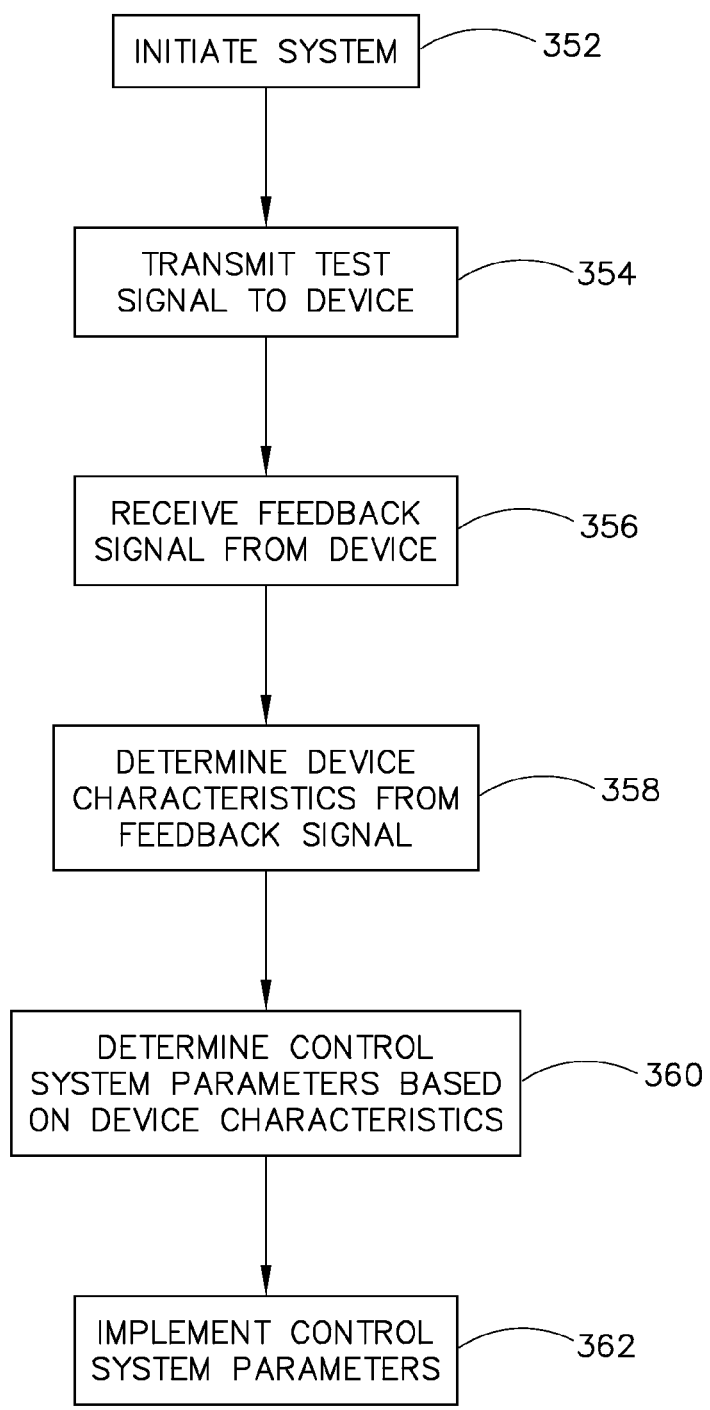
FIG. 11 is a flowchart illustrating a method of implementing the pairing system, according to an exemplary embodiment.

In FIG. 11, a flowchart illustrating a method of implementing the system 350 is shown, according to an exemplary embodiment. The system is initiated (step 352). The system transmits a test signal to a device (step 354). The system receives a feedback, device signal and/or sensor signal from the device (step 356). The system determines device characteristics from feedback, device signal and/or sensor signal (step 358). The system determines control system parameters based on device characteristics (step 360). The system implements control system parameters (step 362).

Figure 12:
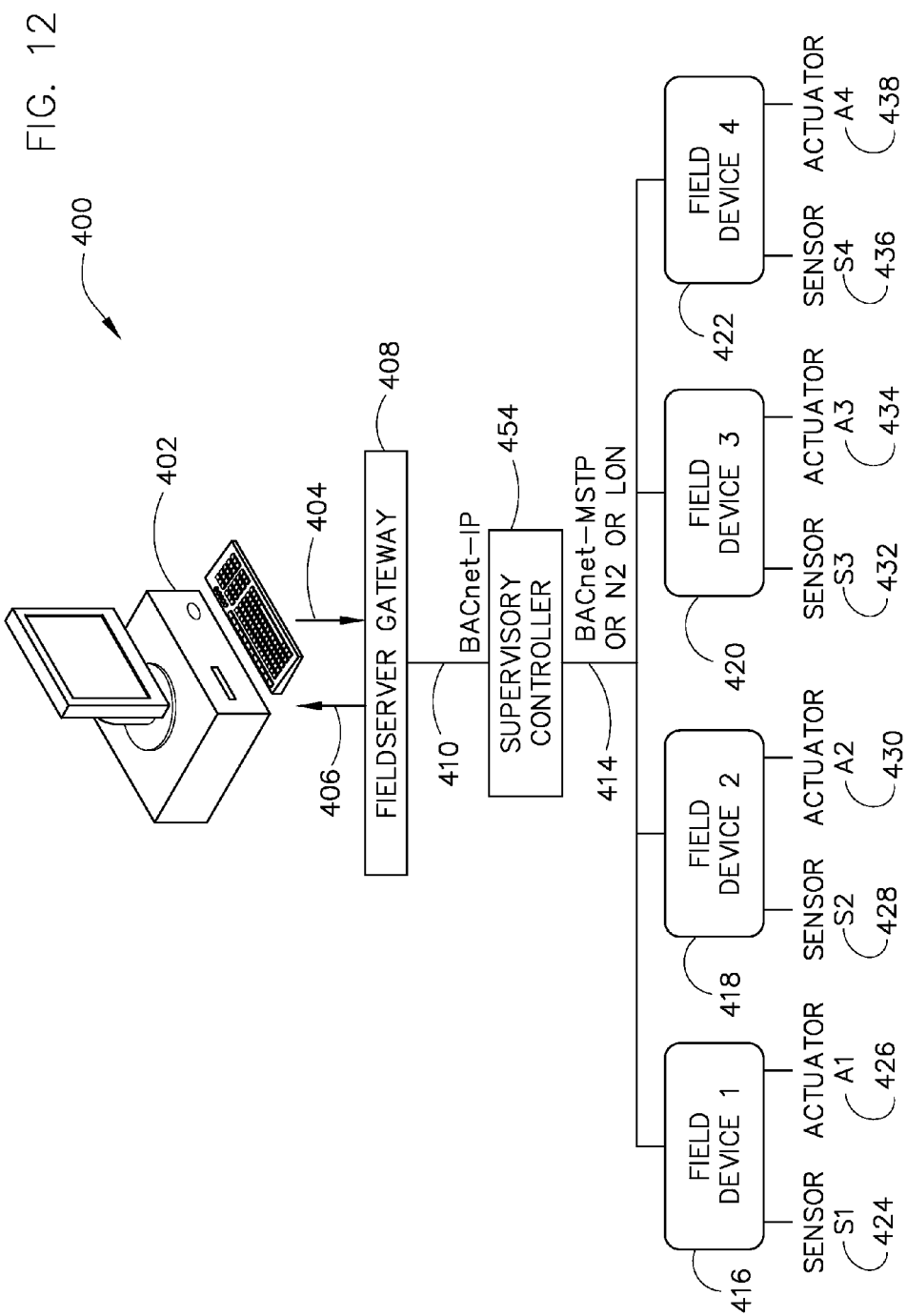
FIG. 12 is an illustration of a method of implementing a centralized control function, according to one exemplary embodiment.

In FIG. 12, an illustration of a method of implementing a centralized control function 400 is shown, according to one exemplary embodiment. Central control center 402 may control one floor, multiple floors, an entire building, multiple buildings, a campus or any combination thereof. Central control center 402 may transmit a first command 404 via a gateway 408 to a supervisory controller 454. Supervisory controller 454 may transmit first command 404 via a communication link 414 to a field device 416, 418, 420, and 422. In an exemplary embodiment, field device 416, 418, 420, and 422 may include a sensor 424, 428, 432, 436, and an actuator 426, 430, 434, and 438. Field device 416, 418, 420, and 422 may communicate utilizing the same communication system to transmit a first response 406 to central control center 402.

Figure 13:
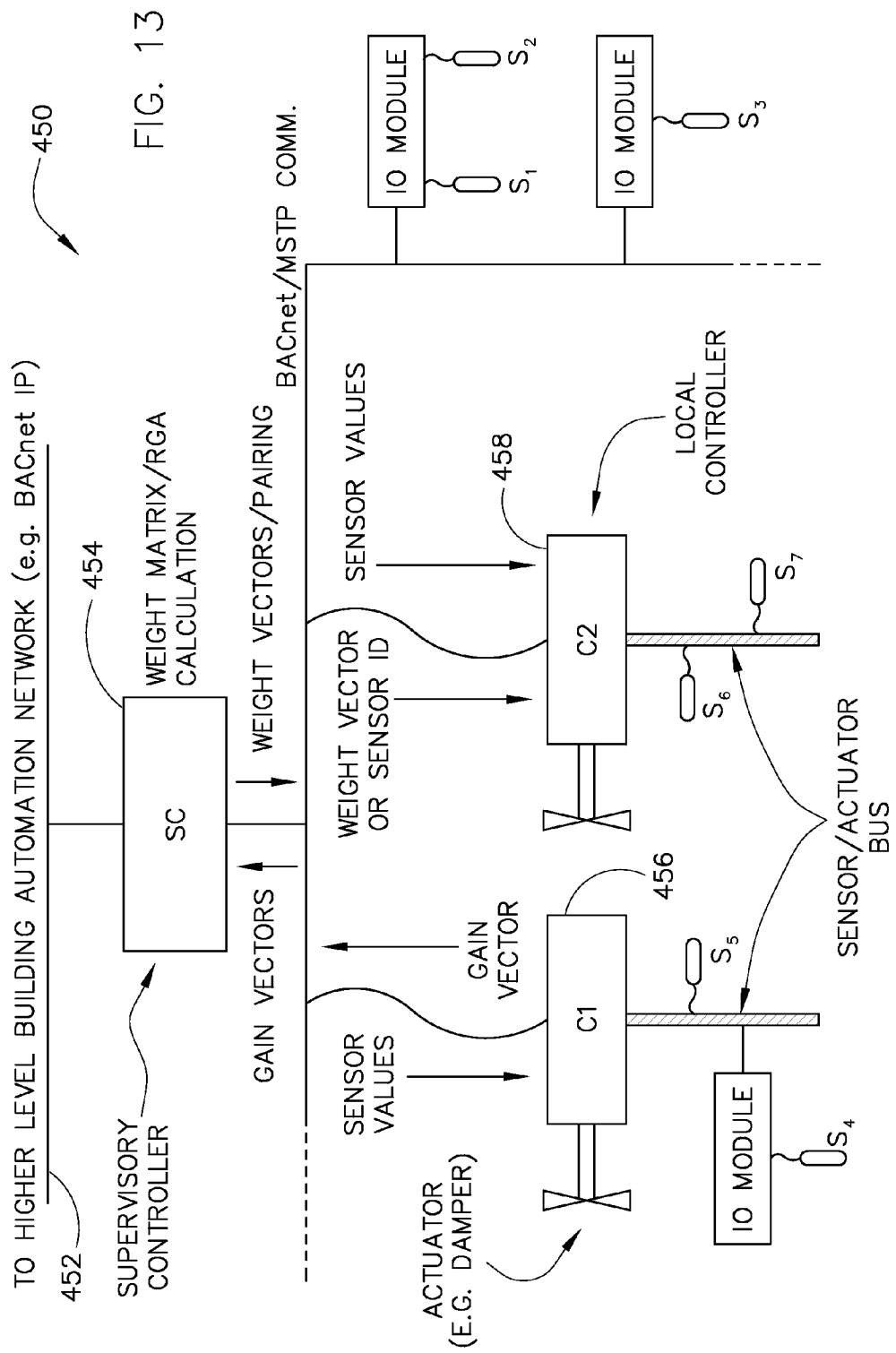
FIG. 13 is an illustration of a wired control system, according to one exemplary embodiment.

In FIG. 13, an illustration of a wired control system 450 is shown, according to one exemplary embodiment. In an exemplary embodiment, a supervisory controller 454 may be configured to utilize weight matrix, RGA or any combination of these methods to control a first damper 456 or a second damper 458. Supervisory controller 454 may initiate a signal for the weight vectors/pairing and receive gain vector signals. In an exemplary embodiment, supervisory controller 454 determines the weight matrix and RGA values. In other exemplary embodiments, the weight matrix and RGA value determinations may be implemented at the building automation level, building device and/or sensor level, at a workstation or a remote local (e.g., service center). In an exemplary embodiment, supervisory controller 454 may communicate with higher level building automation system via a higher level building automation network 452. It should noted that any number of building devices may be utilized.

Figure 14:
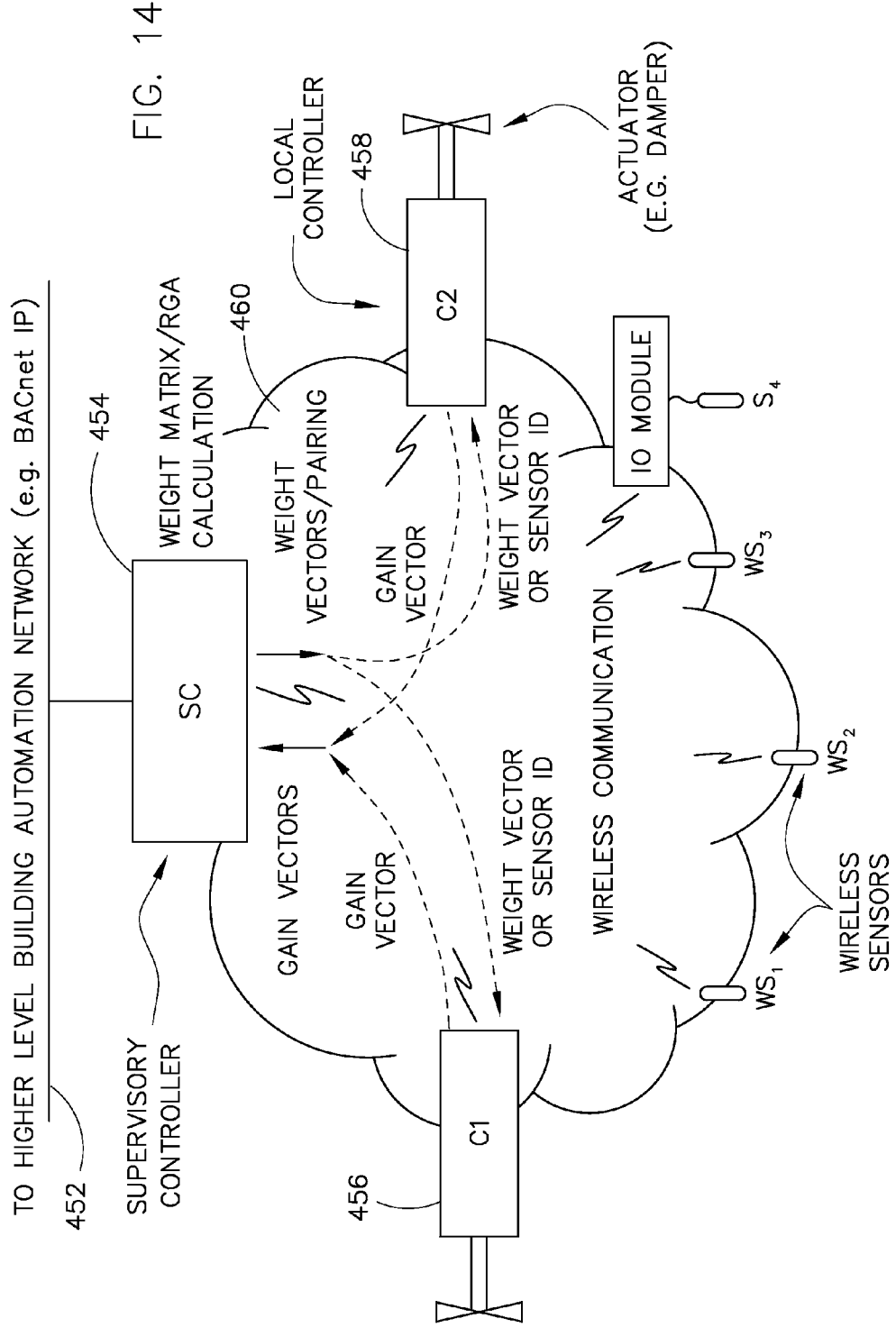
FIG. 14 is an illustration of a wireless control system, according to one exemplary embodiment.

In FIG. 14, the control system shown in FIG. 13 is illustrated in a wireless configuration, according to one exemplary embodiment. Supervisory controller 454 may be configured to utilize weight matrix, RGA or any combination of these methods to control first damper 456 or second damper 458. Supervisory controller 454 initiates a signal for the weight vectors/pairing and receives a gain vector signals. In an exemplary embodiment, supervisory controller 454 utilizes a wireless network 460 to communicate to building devices (e.g., first damper 456) and utilizes higher level building automation network 452 to communicate to a higher level building automation system.

In an exemplary embodiment, the system and method for automatically configuring the sensors and actuators in a MIMO system may use real time optimization. In another exemplary embodiment, the system and method for automatically configuring the sensors and actuators in a MIMO system may use a pairing technique. In another exemplary embodiment, the system and method for automatically configuring the sensors and actuators in a MIMO system may use a weighting sensors and actuators technique.

The control structure/configuration is determined based on the multivariable plant parameters. The plant parameters are identified by exciting the system either one input at a time or simultaneously. The control structure/configuration could be a decentralized/multi-loop structure where a sensor is paired with an actuator, a decoupled structure where sensors and/or actuators are weighted, or real time optimization methods may be used to determine the best weighting of sensors and actuators.

A significant advantage of the pairing system is the reduction of controller configuration time during installation. In the new installation setting, the field engineer would simply install the sensors and actuators and allow the pairing system to determine the best configuration for control. The pairing system is also well suited for wireless sensing and control. Using this technology, controller reconfiguration can be performed automatically after a building or space undergoes remodeling. Currently, relocation of sensors and actuators after remodeling can require controller reconfiguration. With the pairing system, this could be done automatically, thereby reducing re-commissioning time.

It should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose, or by a hardwired system.

The construction and arrangement of the control system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. In the claims, any means-plus-function clause is intended to cover the structures described herein as performing the recited function, and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machine to perform a certain function or group of functions.

What is claimed is:

1. A monitoring system including an interface configured to communicate with a building device, a sensor, and a memory, comprising:
   a processor configured to communicate with the memory and the interface, the processor configured to transmit a test signal to at least one of the building device and the sensor, the processor further configured to receive a return signal from at least one of the building device and the sensor; and
   wherein the processor is configured to associate the building device with the sensor based on the return signal.

2. The monitoring system of claim 1, wherein the test signal is at least one of a sine wave, a pulse, a white noise, and a step change.

3. The monitoring system of claim 1, wherein the building device is an actuator.

4. The monitoring system of claim 1, wherein the processor is configured to transmit a plurality of test signals in a sequential order.

5. The monitoring system of claim 4, wherein the plurality of test signals are pulses.

6. The monitoring system of claim 1, wherein the processor is configured to transmit a plurality of test signals substantially simultaneously.

7. The monitoring system of claim 1, wherein the building device is a damper.

8. A method of monitoring a system, comprising:
- transmitting a test signal to at least one of a building device and a sensor;
- receiving a return signal from at least one of the building device and the sensor; and
- determining an association between the building device and the sensor based on the return signal.

9. The method of claim 8, wherein the test signal is at least one of a sine wave, a pulse, a white noise, and a step change.

10. The method of claim 8, wherein the building device is an actuator.

11. The method of claim 8, wherein the building device is a damper.

12. The method of claim 8, further comprising transmitting a plurality of test signals in a sequential order.

13. The method of claim 12, wherein the plurality of test signals are pulses.

14. The method of claim 8, further comprising transmitting a plurality of test signals substantially simultaneously.

15. The method of claim 14, wherein the plurality of test signals are sine waves.

16. A program product for monitoring a system, the program product comprising machine-readable program code for causing, when executed, one or more machines to perform the following method steps:
- transmitting a test signal to at least one of a building device and a sensor;
- receiving a return signal from at least one of the building device and the sensor; and
- determining an association between the building device and the sensor based on the return signal.

17. The program product of claim 16, wherein the test signal is at least one of a sine wave, a pulse, a white noise, and a step change.

18. The program product of claim 16, further comprising transmitting a plurality of test signals in a sequential order.

19. The program product of claim 18, wherein the plurality of test signals are pulses.

20. The program product of claim 16, further comprising transmitting a plurality of test signals substantially simultaneously.

* * * * *